Figure 1:
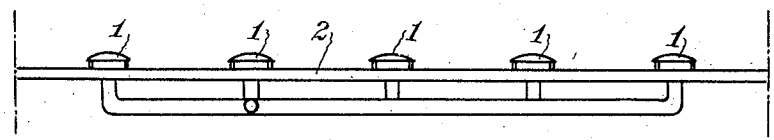

G. TROLLE-BONDE.
APPARATUS FOR AIRING OF STORED CORN.
APPLICATION FILED NOV. 19, 1919.

1,349,538.

Patented Aug. 10, 1920.
2 SHEETS—SHEET 1.

Inventor
Gustaf Trolle-Bonde
by
Attorney

G. TROLLE-BONDE.
APPARATUS FOR AIRING OF STORED CORN.
APPLICATION FILED NOV. 19, 1919.
1,349,538.
Patented Aug. 10, 1920.
2 SHEETS—SHEET 2.
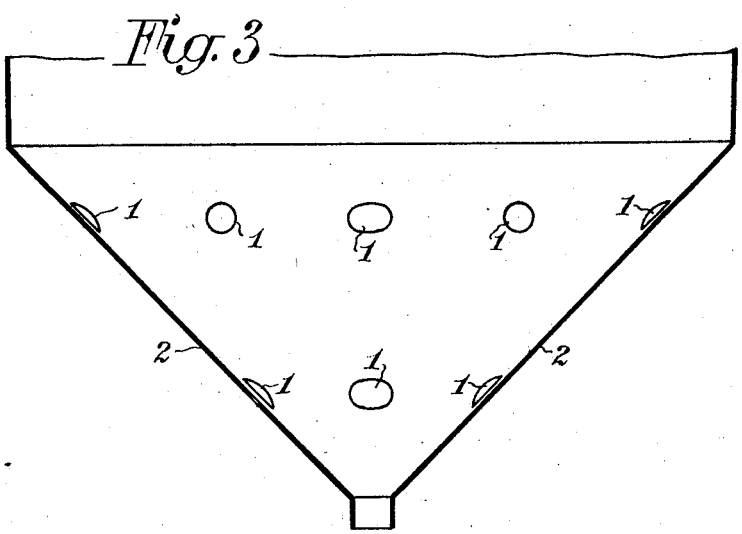
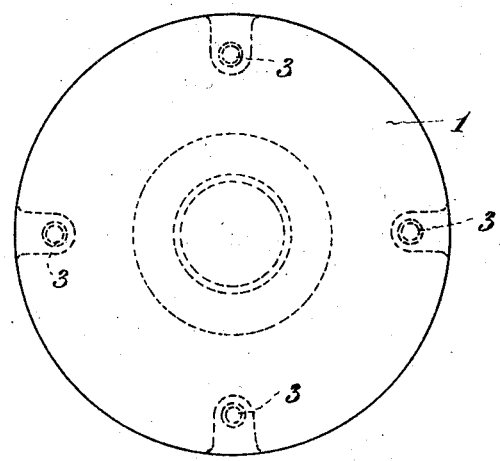
Inventor
Gustaf Trolle-Bonde
Attorney

UNITED STATES PATENT OFFICE.

GUSTAF TROLLE-BONDE, OF TROLLEHOLM, SWEDEN.

APPARATUS FOR AIRING OF STORED CORN.

1,349,538.      Specification of Letters Patent.      Patented Aug. 10, 1920.

Application filed November 19, 1919. Serial No. 339,171.

*To all whom it may concern:*

Be it known that I, GUSTAF TROLLE-BONDE, a citizen of Sweden, residing at Trolleholm, in the county of Malmöhus, Sweden, have invented a new and useful Improvement in Apparatus for Airing of Stored Corn, of which the following is a specification.

The invention relates to apparatus for a complete and careful airing of corn stored in granaries or elsewhere.

A number of different devices for airing of corn that is kept stored during a long time have already been proposed. By these devices it has however been impossible to prevent, that the corn, notwithstanding the supply of air, is damaged and forms lumps or clods, thus making it difficult to empty the storehouse, especially when the corn is kept in granaries, as the lumps will prevent the corn from flowing out by its own weight. These disadvantages are due partly to an inappropriate form and partly to an unsuitable position of the nozzles through which the air is supplied. It has been proposed in granaries to arrange the air inlet combined with the outlet of corn at the lower part of the bottom of the granary, but the single air inlet thus provided is insufficient for an effective airing of a granary of common size, and the drawing off of the corn from the granary is also rendered difficult, as the nozzle of course must be given such a form that it is not stopped up by the corn during the supply of air, and it is just this form that makes the flowing out more difficult. It is therefore inappropriate to combine the air inlet with the outlet of corn, and this disadvantage is remedied according to the invention by making the air inlets independent of the outlet openings for the corn. In this way the advantage is also gained that the necessary number of air inlets may be provided and that they may be placed in right positions. It has also been proposed to arrange the air inlets without being combined with the outlet openings for the corn, but in these cases the air has been given such a direction that it does not sweep along the bottom and the walls of the granary, which is very important, as it is just at these walls where the corn is baking. Also this drawback is removed by the invention by giving the air inlets or nozzles such a form that the air currents sweep over the bottom of the granary and then pass upward through the layer of corn. In this way an effective airing is obtained even when the layer of corn is comparatively thin, and spread over a large surface, as might be the case in stores having a horizontal bottom, in which air inlets of the known type blowing in the air perpendicularly to the floor of the magaine are useless, as the thin layer of corn first is blown away by the air currents and then their efficiency is nullified.

Figure 2:
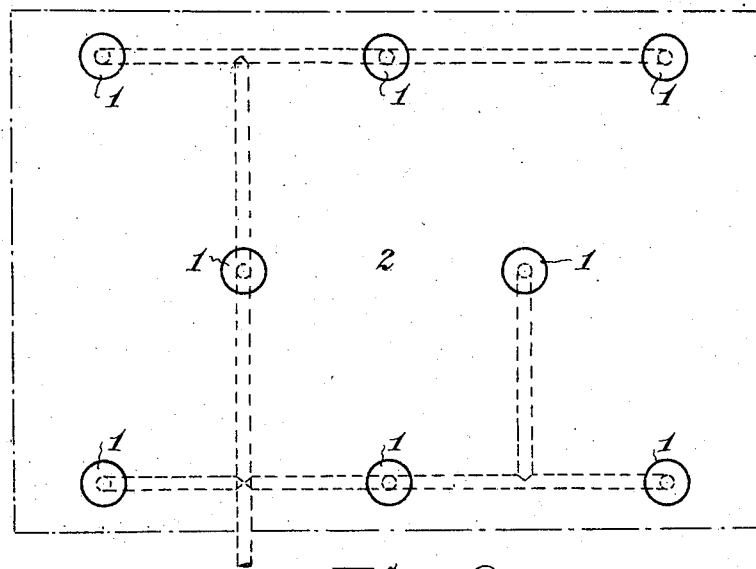
Figure 4:
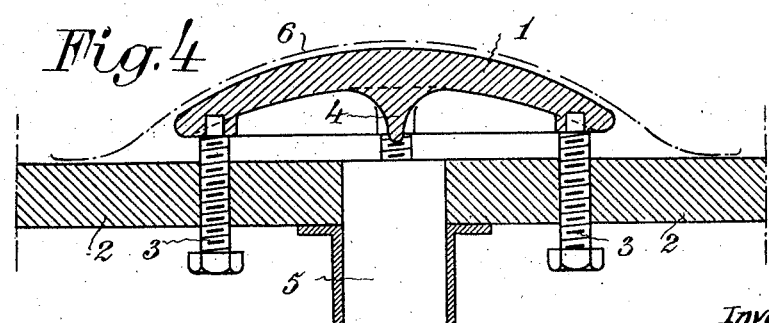

The invention is illustrated in the accompanying drawings. Figure 1 is a side view of the device applied in a magazine or the like with flat bottom. Fig. 2 is a top view of the same. Fig. 3 shows the invention applied to a granary with conical bottom. Fig. 4 is a vertical section on a larger scale of the air nozzle, and Fig. 5 is a top view of the same.

According to the invention the nozzles, through which the air is blown into the corn receptacle are placed on its bottom surface independently of other openings therein for other purposes, such as openings for drawing off the corn and the like, and they are also given such a form that the air is blown in parallelly with the surface in which the nozzles are arranged and as near to this surface as possible. The nozzles may be given different forms and a very suitable form is shown in Figs. 4 and 5. Here the nozzles consist of a hollow, calotte shaped disk 1 fastened to and carried by the bottom 2 of the corn receptacle by means of a suitable number of screws 3 going through the bottom of the receptacle and on its outer side provided with heads, by means of which the screws may be turned from the outside in such a way that the disk is lifted from or brought nearer to the bottom of the receptacle. On the under side of the disk is centrally arranged a cone 4 having its apex directed downward in order to give the air current coming in through the pipe 5 perpendicularly to the bottom of the receptacle such a direction that it leaves the nozzle as evenly distributed as possible around the whole circumference of the disk and parallel with the surface of the bottom of the receptacle, at the same time keeping the frictional resistance in the nozzle as low as possible. By using such a form of nozzle the corn will be intensely blown through especially at the bottom surface, and the air currents crossing each other in all directions pass upward through the layer of corn as uniformly distributed as possible. The disks may be raised and lowered in relation to the bottom of the receptacle by means of the screws, and thus the size of the air inlets may be varied for the supply of more or less air or for shutting off the supply of air totally in certain places. In order to prevent the corn from impeding the movement of the disks the latter are covered with a wire grating 6 (Fig. 4), so that the corn cannot penetrate under the edges of the disks and prevent their closing movement.

In Figs. 1 and 2 the invention is shown as applied to a corn receptacle with horizontal bottom, and it is evident that by this arrangement even a very thin layer of corn may be blown through effectively just as well as a thicker layer. In order to obtain the best possible result by using the smallest possible number of nozzles these are placed in rows in which the nozzles in one row are zigzag in relation to the nozzles in the adjacent rows. The same arrangement may be used when the bottom of the receptacle has other forms.

According to Fig. 3 the nozzles are in the same way as uniformly distributed as possible in equal distances from each other over the whole, conical surface and without being combined with other openings in the same. Thus they are quite independent of the outlet opening. When the nozzles are arranged in this way their number may of course be varied in such a way that a sufficient supply of air in all cases is obtained independently of the volume of the receptacle.

The number of nozzles is in both cases arbitrary and it is suited after the requirements and the pressure of the air. As it is not necessary that the supply of air is the same during different seasons or for different kinds of corn, it may be adapted to each separate case by regulating or closing the disks. The nozzles described may of course also be arranged in the vertical side walls of the receptacles if this is required, for instance in very high granaries.

I claim as my invention.

The combination with a corn or similar receptacle, having an air admission pipe leading there into, of a hood overlying the end of said pipe within the receptacle and having a cone shaped deflector arranged in line with and wholly beyond the pipe, and a plurality of elements connected with the hood immediately adjacent the free edge thereof and beyond the air pipe, said elements having threaded connection with the receptacle and being operable from beyond the receptacle.

In testimony whereof, I have signed my name to this specification in the presence of two subscribing witnesses.

GUSTAF TROLLE-BONDE.

Witnesses:
 HJ. BRANZELL,
 GUNHILD PETERSSON.